Figure 1:
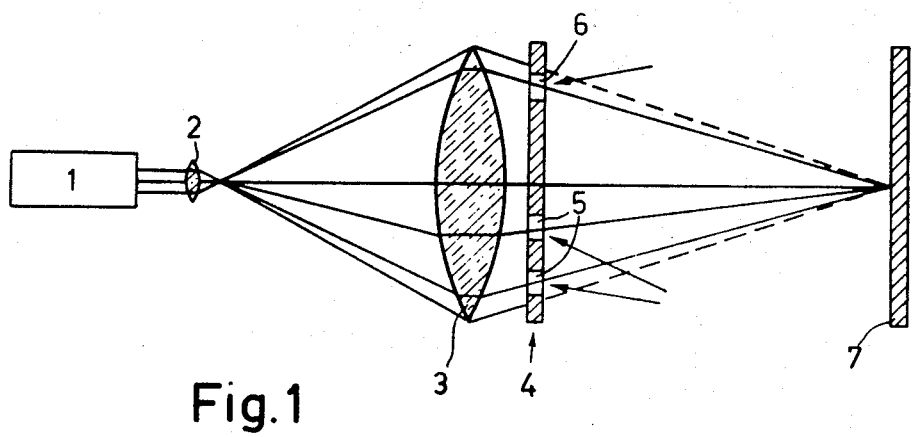

United States Patent

[11] 3,622,219

[72] Inventor Gunther Groh
Hamburg, Germany
[21] Appl. No. 874,117
[22] Filed Nov. 5, 1969
[45] Patented Nov. 23, 1971
[73] Assignee U.S. Philips Corporation
New York, N.Y.
[32] Priority Nov. 9, 1968
[33] Germany
[31] P 18 08 131.7

[54] METHOD OF PRODUCING HOLOGRAMS WHICH ON RECONSTRUCTION FROM SMALL SIZE IMAGE POINTS
10 Claims, 2 Drawing Figs.

[52] U.S. Cl. .................................................. 350/3.5
[51] Int. Cl. .................................................. G02b 27/22
[50] Field of Search ................................... 350/3.5

[56] References Cited
OTHER REFERENCES

Cathey, J. Opt. Soc. Am., p. 457 (4/1965)
Leith et al., J. Opt. Soc. Am. p. 523 (4/1966)
Lu, Proc. IEEE, Vol. 56 No. 1, pp. 116–117 (1/1968).

*Primary Examiner*—David Schonberg
*Assistant Examiner*—Robert L. Sherman
*Attorney*—Frank R. Trifari ABSTRACT: A method of producing a hologram for imaging multiple small sized image points on reconstruction. The hologram is formed by illuminating a recording medium with a converging coherent beam through a diaphragm containing image-forming pinholes considerably larger than the images to be formed and also containing a pinhole of the same shape as the image forming pinholes and acting as a reference source.

INVENTOR.
GUNTHER GROH

BY

AGENT

METHOD OF PRODUCING HOLOGRAMS WHICH ON RECONSTRUCTION FROM SMALL SIZE IMAGE POINTS

The invention relates to a method of producing holograms by means of signal light sources and a reference light source, which holograms on reconstruction by means of a point source form small size image points. Holograms of this kind, which are referred to as point holograms, can be used in two manners. In one manner of use an image consisting of discrete image points can Integration reconstructed. This is the case, for example, with synthetic holograms of objects which have been described mathematically but are not available physically or in the holographic storage of the information contained in punched cards or the like. In the other manner of use, the point hologram is used as an optical filter. Examples of this use are the image multiplication (G. Groh: Multiple Imaging by Means of Point Holograms, Applied Optics 7 (1968) (1643) or the addition of a plurality of identical images in order to improve the signal-to-noise ratio (H. J. Einighammer) Holographische Integration photographischer Bilder,Naturwissenschaften 55 (1968) 295).

Several methods of producing point holograms are known. In all these methods, point light sources the size of which corresponds to the size of the desired image points are used as the signal and reference sources. In most cases these light sources are in the form of suitably illuminated pinhole diaphragms. Frequently the only step taken is to focus the incident light by means of lenses. The light emanating from the focal points then is recorded holographically, i.e. the focal points are used as light sources. In another known method the exit face of a fiber-optical system or of a single light conductor is used as the point radiator.

The use of these methods is problematic of image points of very small size are to be formed by means of the point hologram. For example it is extremely difficult to reproducibly manufacture diaphragm pinholes having diameters of about $1\mu m$ and to illuminate them so that there are no excessive light losses. When high energy laser radiation is used, as frequently is necessary, the permissible energy density often is exceeded so that the pinhole diaphragms are destroyed. In lenses troublesome aberrations will occur in this range, unless very expensive corrected objectives are used. Light conductors of sizes of the order of magnitude of the wavelength of the light generally are unsuitable because of their losses. In addition, the intensity of the radiated light is not evenly distributed in accordance with the excited natural oscillations of the light conductor. This gives rise to unfavorable exposure ratios in the production of the point hologram.

It is an object of the method according to the invention to avoid the disadvantages of the known methods. The invention is characterized in, that in the production of a hologram illuminated pinhole diaphragms of sizes considerably greater than those of the image points are used as signal light sources the pinhole diaphragms having similar structures, and in that a pinhole diaphragm of a structure similar to that of the diaphragms which act as the signal sources is used as the reference light source. Preferably, this reference light source generally lies in the same plane as the signal light sources. In the case of point holograms in which the signal sources and the reference source are spaced by different distances from the photographic plate on which the hologram structure is recorded, corresponding magnification and reduction factors must be used in the manufacture of the pinhole diaphragms.

The use of such pinhole diaphragms having given structures and comparatively large diameters is of great advantage in producing point holograms. When phase structures are used the light losses can be reduced to a minimum. Also, in the case of high-energy laser radiation the energy density can be maintained at a desired small value without detracting from the resolving power of the point holograms.

The structures in the pinhole diaphragms are such that the cross-correlation functions between the signal waves which are spatially modulated by the structured pinhole diaphragms and the reference wave closely approximate to $\delta$ functions, i.e. needle-shaped functions. The spatial displacement coordinates of these $\delta$ functions then define the positions of the image points obtained in the reconstruction by means of a point reference source.

In order to avoid light losses phase structures are particularly advantageous. In making a selection from the possible structures, the following should be kept in mind.

The mean intensity distribution of the light scattered by the pinhole diaphragm must be uniform in the plane of the hologram so that as far as possible only interferences between wave fronts of comparable intensities need to be recorded in the hologram. For the same reason, the pinhole diaphragms must be illuminated so that the centers of the light distributions originating from the differently located diaphragms structures coincide in the hologram plane. This is effected most simply by illuminating them with converging wave fronts the centers of curvature of which lie in the hologram plane. The minimum size of the reconstructible image points is determined by the aperture of the hologram. Hence, in producing the hologram the scattering lobe of the light scattered by the diaphragm structures must have a sufficiently large relative aperture. On he other hand, suitable shaping of the scattering lobe permits of obtaining shadings of the effective hologram aperture by means of which, for example, an apodisation or a partial compensation of the modulation transmission functions of the material on which the hologram is recorded is obtainable.

There are several structures which satisfy these conditions. In each individual case optimization is obtainable only by taking the specific use into account. For example, rotation-symmetrical structures have the advantage of being insensitive to rotary movement during adjustment. Statistic structures having the properties of ground-glass plates have a much greater sensitivity in this respect and also with regard to the influence of the illumination. HOwever, the latter structures possess the advantage that the reconstructed image points have a high contrast. In addition, they can readily be manufactured by means of the method described hereinafter.

The main requirement to be satisfied in manufacturing pinhole diaphragms is that the structure of the diaphragms must correspond to that of the reference source. Since such a high reproducibility can scarcely be reached by means of mechanical or chemical methods, it is further proposed according to the invention to expose a photographic plate many times with a fragment of the same statistical light distribution, the plate being shifted between the successive exposures. The situation of the exposed parts corresponds to the desired positions of the image points. In order to convert the resulting identical amplitude structures into phase structures they are bleached or copied on photoresist. The unused areas are made opaque.

The statistical light distribution required for carrying out this method can be obtained in a very simple manner by causing coherent light, for example laser light, to scatter at a surface of uniform roughness. The scattered light then has a statistical intensity distribution of granular structure, the so-called granulation. The fineness of the granulation is adjustable by the manner of exposure and by the choice of the distance.

The use of this known phenomenon provides the advantage that no image-forming optical systems are required, in other words, even very fine-grained ground-glass plates can be made without restrictions due to the resolving power of optical elements.

FIG. 1 shows, by way of example, an embodiment of an arrangement for carrying out the method according to the invention, A laser light source 1 produces by means of an optical system 2, 3 a converging spherical wave which impinges on a plate 4. This plat 4 contains the comparatively large-size pinhole diaphragms of a desired structure which serve as the signal light sources and also a pinhole diaphragm 6 of the same structure which serves as a reference light source. A developed (transparent) photographic plate 7 is the desired hologram. When this hologram is illuminated by means of a monochromatic point light source, image points are produced at the positions at which the interference pattern of the interfering signal and reference waves has been recorded. The size of each image points is much smaller than that of the signal source.

The holograms produced by means of the method according to the invention can be used for the same purposes as can point holograms recorded in the usual manner. More particularly they may be used in a method of multiplying images.

Figure 2:
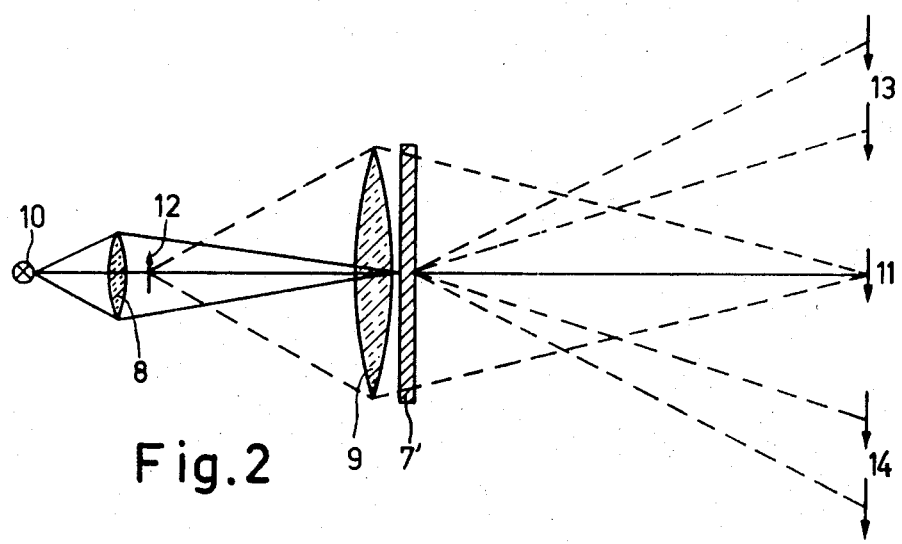

An embodiment of an arrangement for this purpose is shown schematically in FIG. 2. A respective point hologram 7' (for example the photographic plate 7) need only be placed in the exit pupil or an equivalent plane of a normal optical image-forming system 8, 9 which may use as source 10 of coherent light or of spatially incoherent light. In order to reduce aberrations to a minimum the holograms 7' is advantageously oriented so that the position of the reference light source used in he production of the hologram coincides with the center of gravity of the real image 11 of the object 12. Thus, further real images 13 and 14 are obtained at the locations which correspond to the positions of the signal light sources used in the production of the hologram. The resolving power is determined by the image-forming system 8, 9 and by the width of the cross-correlation functions between the signal light sources and the reference light source.

What is claimed is:

1. A method of producing holograms capable of imaging radiation into small image points having a predetermined size, comprising illuminating a portion of a hologram recording medium with coherent radiation through a diaphragm having pinhole apertures larger than the predetermined size of the image points, and illuminating the same portion of the hologram recording medium with a reference beam of coherent radiation through an aperture having substantially the same shape as the pinhole apertures.

2. A method as claimed in claim 1, wherein the step of exposing the hologram recording medium comprises interposing a uniform ground-glass pinhole structure.

3. A method as claimed in claim 2, wherein the step of interposing the ground-glass structure comprises multiple exposing a photographic plate with a fragment of the same statistical intensity distribution of scattered coherent light, shifting the photographic plate between successive exposures, and forming the ground-glass plate from the photographic plate.

4. A method as claimed in claim 3, wherein the resulting amplitude structures are constructed into phase structures by copying on a photolacquer.

5. A method as claimed in claim 3, wherein the resulting amplitude structures are converted into phase structures by bleaching of the photographic emulsion.

6. A method as claimed in claim 1, wherein the structure in the pinhole diaphragms are chosen so that the cross-correlation functions between the signal waves spatially modulated by the pinhole diaphragms and the reference waves closely approximate to δ-functions the spatial displacement coordinates of which define the positions of the image points which are formed on reconstruction.

7. A method as claimed in claim 1, wherein the mean intensity distribution of the light scattered by a pinhole diaphragm is uniform in the hologram plane.

8. A method as claimed in claim 1, wherein the pinhole diaphragms are illuminated so that the centers of gravity of the light distributions originating from differently positioned diaphragms structures coincide in the hologram plane.

9. A method as claimed in claim 1, wherein the pinhole diaphragms are illuminated so that the scattering lobe of the light scattered by the pinhole diaphragm has an aperture which is favorable in view of the desired size of the image points to be reconstructed.

10. A point hologram produced by means of the method claim in claim 1.

* * * * *

PO-1050
(5/69)

UNITED STATES PATENT OFFICE
CERTIFICATE OF CORRECTION

Patent No. 3,622,219                   Dated November 23, 1971

Inventor(s) GUNTHER GROH

It is certified that error appears in the above-identified patent and that said Letters Patent are hereby corrected as shown below:

In the title, line 2, "From" should be --Form--;

In the abstract, line 6, "shape" should be --size--;

Col. 1, line 9, "Integration" should be --be--;

Col. 2, line 34, "HOwever" should be --However--;

Col. 2, line 56, "," should be --.--;

Col. 2, line 57, "plat" should be --plate--

Col. 3, line 17, "he" should be --the--;

IN THE CLAIMS

Claim 2, line 3, after "structure" insert --intermediate the recording medium and a source of coherent radiation--;

Claim 10, line 2, "claim" 1st occurence should be --claimed--.

Signed and sealed this 4th day of July 1972.

(SEAL)
Attest:

EDWARD M. FLETCHER, JR.
Attesting Officer

ROBERT GOTTSCHALK
Commissioner of Patents